(12) United States Patent
Grözinger et al.

(10) Patent No.: US 8,991,307 B2
(45) Date of Patent: Mar. 31, 2015

(54) LID FOR A PRESSURE COOKER

(75) Inventors: Roland Grözinger, Laupheim (DE); Karl-Heinz Wontke, Bad Buchau (DE); Jochen Schobloch, Bad Bachau (DE)

(73) Assignee: Silit-Werke GmbH & Co. KG, Riedlingen (DE)

( * ) Notice: Subject to any disclaimer, the term of this patent is extended or adjusted under 35 U.S.C. 154(b) by 397 days.

(21) Appl. No.: 13/514,634

(22) PCT Filed: Dec. 8, 2010

(86) PCT No.: PCT/EP2010/007469
§ 371 (c)(1),
(2), (4) Date: Jun. 29, 2012

(87) PCT Pub. No.: WO2011/069649
PCT Pub. Date: Jun. 16, 2011

(65) Prior Publication Data
US 2012/0255951 A1 Oct. 11, 2012

(30) Foreign Application Priority Data
Dec. 9, 2009 (DE) .......................... 10 2009 047 733

(51) Int. Cl.
*A47J 27/08* (2006.01)

(52) U.S. Cl.
CPC .............. *A47J 27/08* (2013.01); *Y10S 220/912* (2013.01)
USPC .............. 99/337; 99/342; 220/316; 220/912; 219/440

(58) Field of Classification Search
USPC .................... 99/337, 330, 338, 342; 219/440; 220/316, 912
See application file for complete search history.

(56) References Cited

U.S. PATENT DOCUMENTS

| | | | | |
|---|---|---|---|---|
| 4,313,371 | A * | 2/1982 | Jackson et al. | 99/337 |
| 4,330,069 | A | 5/1982 | Bauer | |
| 5,370,259 | A * | 12/1994 | Cartigny | 220/316 |
| 6,135,013 | A * | 10/2000 | Barrena | 99/337 |
| 8,276,507 | B1 * | 10/2012 | Walker | 99/337 |
| 8,813,989 | B2 * | 8/2014 | Hoffmann et al. | 220/316 |
| 2008/0290090 | A1 * | 11/2008 | Kindler et al. | 220/203.05 |
| 2009/0064868 | A1 * | 3/2009 | Cartossi | 99/337 |

FOREIGN PATENT DOCUMENTS

| | | |
|---|---|---|
| CN | 2730263 Y | 10/2005 |
| CN | 101112290 A | 1/2008 |
| CN | 201052080 Y | 4/2008 |
| DE | 2510808 A1 | 9/1976 |
| DE | 3004088 A1 | 8/1981 |

(Continued)

OTHER PUBLICATIONS

Search Report for German Patent Application No. 10 2009 047 733.0 mailed Oct. 13, 2010.

(Continued)

*Primary Examiner* — Reginald L Alexander
(74) *Attorney, Agent, or Firm* — Marshall, Gerstein & Borun LLP (57) ABSTRACT

A lid for a pressure cooker with a removable lid handle, particularly a lid stem handle, with a technology module that has movable operational elements necessary for the function of the pressure cooker and with a masking module that masks the technology module.

17 Claims, 8 Drawing Sheets

(56) References Cited

FOREIGN PATENT DOCUMENTS

| DE | 29701377 U1 | 4/1997 |
| DE | 602005003281 T2 | 9/2008 |
| EP | 1745730 A1 | 1/2007 |
| FR | 1183836 A | 7/1959 |
| JP | 56106615 | 8/1981 |
| JP | 58094815 | 6/1983 |
| JP | 1984151520 | 10/1984 |
| JP | 1985153823 A | 8/1985 |
| JP | 200829837 | 2/2008 |
| WO | WO-0176428 A2 | 10/2001 |
| WO | WO-2004095994 A1 | 11/2004 |

OTHER PUBLICATIONS

Notification of the First Office Action, The Patent Office of the People's Republic of China, Application No. 201080056038.0 dated Nov. 20, 2013.

Notice of Reasons for Rejection, Japanese Patent Application No. 2012-542395, dated Aug. 12, 2014.

Notification of the Third Office Action, The Patent Office of the P.R. China, Application No. 201080056038.0, dated Oct. 20, 2014.

\* cited by examiner

FIG. 11 ly and economically, particularly for different series, in such a way that it is possible to save on production costs and that there results a corresponding variety of designs.

LID FOR A PRESSURE COOKER

CROSS-REFERENCE TO RELATED APPLICATION

The present application claims the benefit of priority of International Patent Application No. PCT/EP2010/007469, filed Dec. 8, 2010, which application claims priority of German Application No. 102009047733.0, filed Dec. 9, 2009. The entire text of the priority application is incorporated herein by reference in its entirety.

FIELD OF THE DISCLOSURE

The disclosure relates to a lid for a pressure cooker.

BACKGROUND

Conventional pressure cookers have lids that are connected to the bottom part of the cooker, in particular, via a bayonet catch. At the same time, the lids have a handle for handling, in particular, a lid stem handle, whereby an adjustment device for the selection of different cooking levels and a display for the pressure range in the cooker is already provided in most handles. Such a lid also has certain operational elements for the functioning of the pressure cooker, such as the previously mentioned pressure display device, a working valve, a safety valve, the previously mentioned device for selecting the cooking levels, etc. At the same time, the operational elements in the known lids are fastened in the cooker lid from the inside and/or are a permanent part of the handle. This means, however, that the design of the lid handle is specified for a lid and in the event of a different design wish or various variants, the complete unit must be exchanged and redesigned.

SUMMARY OF THE DISCLOSURE

With this as the starting point, one aspect of the present disclosure is to provide a lid for a pressure cooker, whereby the lid has a lid handle whose design can be altered simply and economically, particularly for different series, in such a way that it is possible to save on production costs and that there results a corresponding variety of designs.

According to the present disclosure, the lid handle, which is particularly formed as a lid stem handle, has a technology module that has the movable operational elements necessary for the functions of the pressure cooker. This means that these movable operational elements are integrated in and held in the technology module, while the masking module exclusively masks the technology module to the outside and does not have any operational elements necessary for the function of the pressure cooker. The module design of the lid handle allows a large variety of variants, because the masking module has only the function of a masking element, and can be exchanged in a simple manner. Due to the fact that, for example, the technology module can be used for different pressure cooker variants, whereby only a corresponding masking module is selected, the production of different pressure cooker variants is made considerably more economical and simpler. If the masking module can be removed from the technology module, it is also possible for the customer to exchange the masking module after the fact, whereby the new masking module then has, for example, a different shape and/or a different color.

Due to the fact that the lid handle can be removed from the pressure cooker, the operational elements in the technology module can be cleaned and serviced in a simple manner.

The technology module has at least one operational element from the following group: a pressure display device; a lid lock; a movable sealing element of a working valve; a compression spring, in particular, a torsion bar spring, that acts upon the movable sealing element with an adjustable compressive pressure; and an adjustment device for changing the compressive pressure of the spring on the sealing element.

If these elements are situated in the removable lid handle, the lid handle can be taken off and the remaining metal lid can also be placed into the dishwasher for cleaning purposes, for example, which considerably improves the handling and hygiene. This also substantially reduces the production costs for the metal lid.

The technology module has a fastening device for fastening the lid handle to the lid. This means that the technology module holds the operational parts, on the one hand, and is also the mechanically supporting part of the handle, on the other hand. This means that the lid would function together with the technology module even if no masking module were provided.

For this purpose, the technology module is essentially formed from an L-shaped support element, preferably a support plate. Such an L-shaped support element is simple and economical to manufacture and can be arranged to the side of and above the metallic lid element in a stable manner, and can consequently support operational elements that have to be arranged on the upper side of the metallic lid, such as, for example, the working valve or pressure display, but also operational elements that perform their function from the side of the metallic lid element, such as, for example, the lid lock.

If the technology module has the movable sealing element of the working valve, the valve seat is formed in the lid as a separate or integrally molded valve seat part. This means that a part, namely the movable operational part of the working valve, is integrated in a skilful manner in the technology module while the valve seat is formed in the lid. Such an arrangement can be manufactured economically and furthermore also allows very good cleaning of the valve seat, which is exposed when the lid handle is taken off.

The valve seat and/or the sealing element is formed from a solid, e.g., a resin, thermoplast, such as, for example, PEEK, or duroplast. PEEK is a deep crystalline, easy-to-process thermoplast that features both high tensile and bending strength, impact strength and constantly good electrical characteristics from 0° C. to 220° C., as well as favorable sliding and wear characteristics and flame resistance.

The valve seat and/or the sealing element is advantageously formed from metal. The valve seat is in particular formed with a conical shape. It is exceptionally advantageous if the sealing element has a spherical sealing surface, i.e., the sealing element has at least one section that has a corresponding spherical surface that then sits on the conical valve seat part. It is also possible that the valve seat has a spherical sealing surface and the sealing element a conical sealing surface.

Such a valve allows improved response characteristics of the working valve. It is possible here to reliably maintain tolerances of <+/−20 kPa (<+/−0.2 bar). This means that only a small differential pressure is needed between the triggering pressure and the stabilization pressure.

The masking module is advantageously a plastic part that, on its upper side, has at least two openings, for example, for the pressure display device and the adjustment device for changing the compressive pressure on the spring. In this way, the masking module can be very economically manufactured as an injection molded part. The masking module then also has fastening elements with which it can, for example, be firmly clipped to the technology module or with which it can be snapped into place in the technology module. A connection is advantageously implemented by means of a key/lock system.

According to a preferred embodiment, the adjustment device for changing the compressive pressure on the sealing element is formed in such a way that it comprises a rotating mechanism, whereby in particular depending on the rotational movement, i.e., the position of the rotating mechanism, one end of the torsion bar spring is acted upon by a predetermined force in such a way that a certain force directly or indirectly acts on the sealing element from the other end.

A rotary knob is advantageously attached to the rotating mechanism. The rotary knob can also be attached to the rotating mechanism from above only after the masking module has already been connected to the technology module. In this way, a pressure setting, i.e., a selection of the cooking level (for example, cooking level I or II) can be accomplished via a free-moving, locking rotary knob. In addition to a good appearance, such a rotary knob also allows simple handling. Due to the fact that the rotary knob can be rotated into positions that correspond to the various cooking levels (for example, cooking level I or II), or also to a position for removing the steam and/or opening the cooker, the operator can reliably select the individual positions.

Although all operational elements are preferably integrated in the technology module, according to a further embodiment a safety valve in the form of a self-reversing pressure-relief valve can be provided directly in the cooker lid, i.e., in the metallic lid element. If the safety valve is provided directly in the lid element, a high level of safety is guaranteed.

According to a preferred embodiment, a sealing element is provided around an area around the pressure-relief valve, whereby this sealing element seals the lid's upper side with respect to the technology module, in particular the L-shaped support element, and has an opening by means of which the steam escaping from the pressure-relief valve can be dissipated in a lateral direction and/or to the front. In this way, it can be ensured that steam that escapes from the pressure-relief valve cannot escape upwards in an uncontrolled manner, for example, in the direction of the technology module, or escape backwards in an uncontrolled manner, i.e., in the direction of the user's hand. This makes it possible to prevent the danger of the user being burned. "To the front" here means in a direction that points away from the side on which the handle is fastened, or a direction that is aimed toward the middle of the lid.

In a system for different pressure cooker variants, one and the same technology module can be provided to each, whereby only the corresponding masking module differs for various variants and has a different shape and/or color.

BRIEF DESCRIPTION OF THE DRAWINGS

The following disclosure is explained in more detail in the following with reference to the enclosed figures.

DETAILED DESCRIPTION OF THE PREFERRED EMBODIMENT

Figure 1:
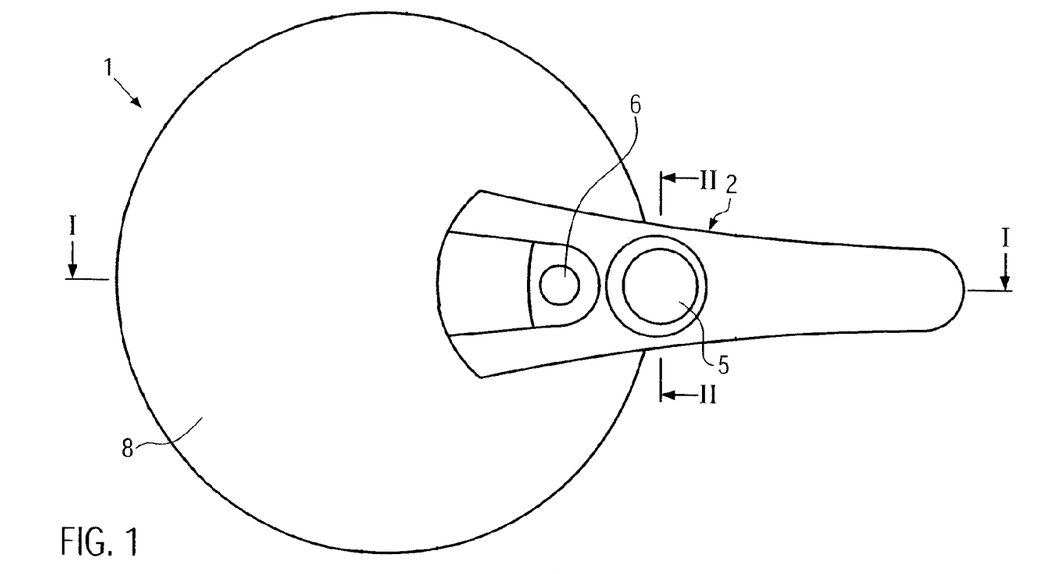
FIG. 1 shows a top view on to a lid in accordance with the present disclosure.
Figure 2:
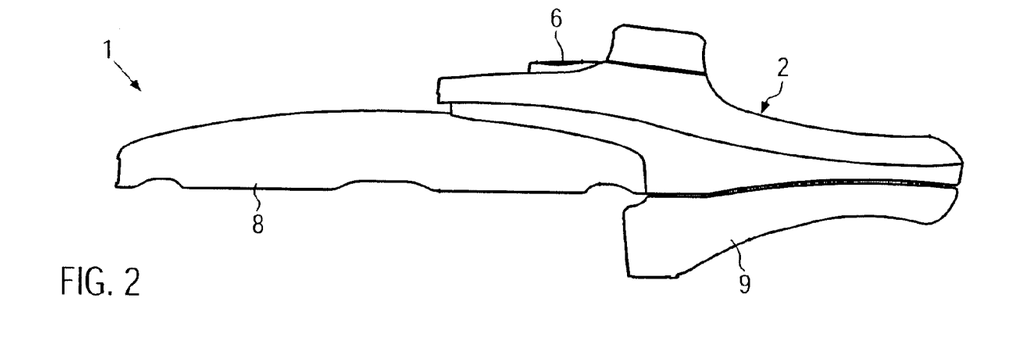
FIG. 2 shows a side view of the lid shown in FIG. 1.
Figure 4:
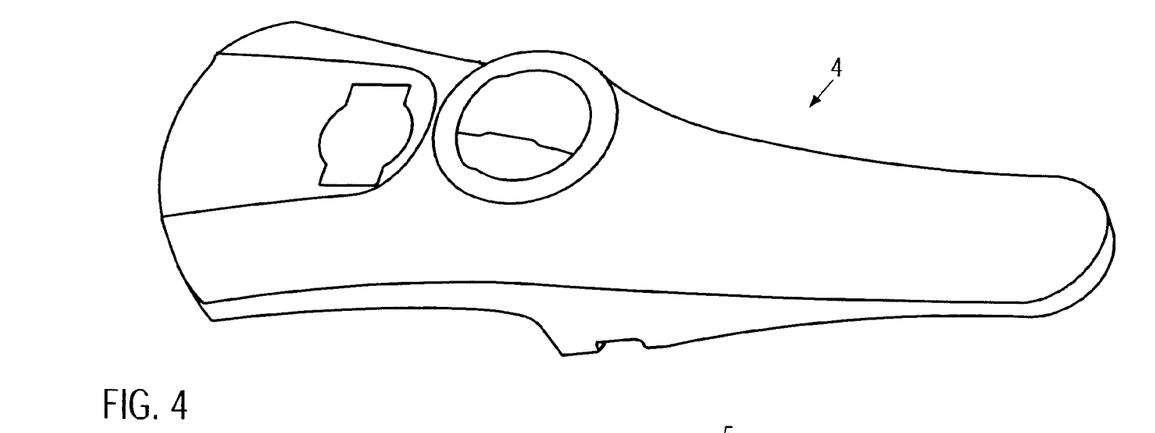
FIG. 4 shows a perspective depiction of the masking module.

FIG. 1 shows a top view on to a lid 1 according to the present disclosure and FIG. 2 shows a side view of this lid. The lid 1 for a pressure cooker (not shown) has a removable lid handle 2, here in the form of a lid stem handle 2. Even if the disclosure is described in the following in association with a lid stem handle by way of example, the disclosure is, however, also equally suitable for other types of handles, such as stub handles, U-shaped handles, etc. The lid stem handle 2 here is arranged in such a way that it surrounds a certain section of the surface of the lid element 8 as well as a side area adjacent thereto. In the closed state, the lid stem handle 2 comes to rest above a stem handle 9 which is connected to the cooker, so that the cooker, when closed, can be grasped at the stem handles 9 and 2. For this purpose, the lid stem handle 2 projects beyond the lid element 8, laterally outwards beyond the outer contour of the cooker. The lid, i.e., the lid element 8, can, as is generally known, be connected to the cooker by means of a bayonet catch. As particularly follows from FIGS. 4 to 6, the lid stem handle has a technology module 3, as well as a masking module 4, that masks the technology module 3, whereby the masking module 4 can be attached or clipped on to the technology module 3 and is connected in particular by means of a key/lock system.

Figure 3:
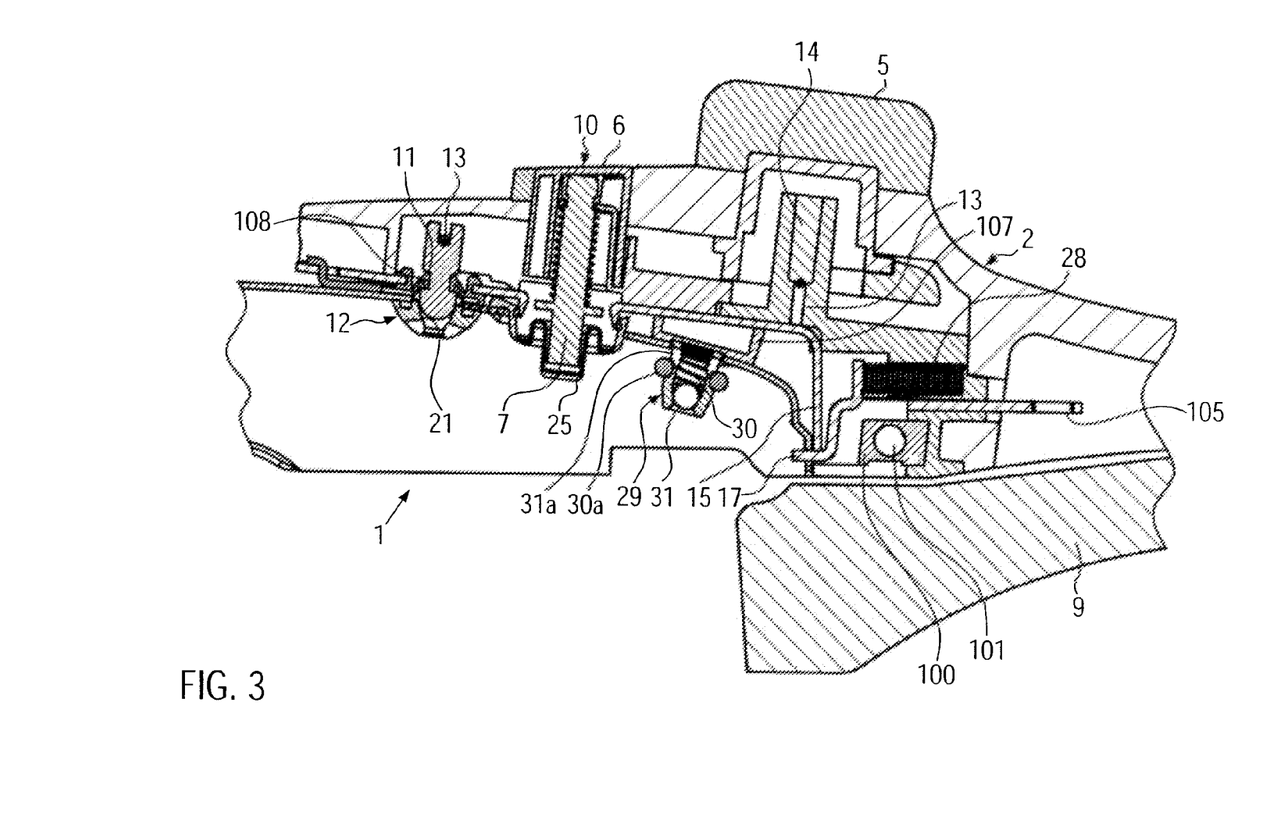
FIG. 3 shows a cut along the line I-I in FIG. 1.
Figure 7:
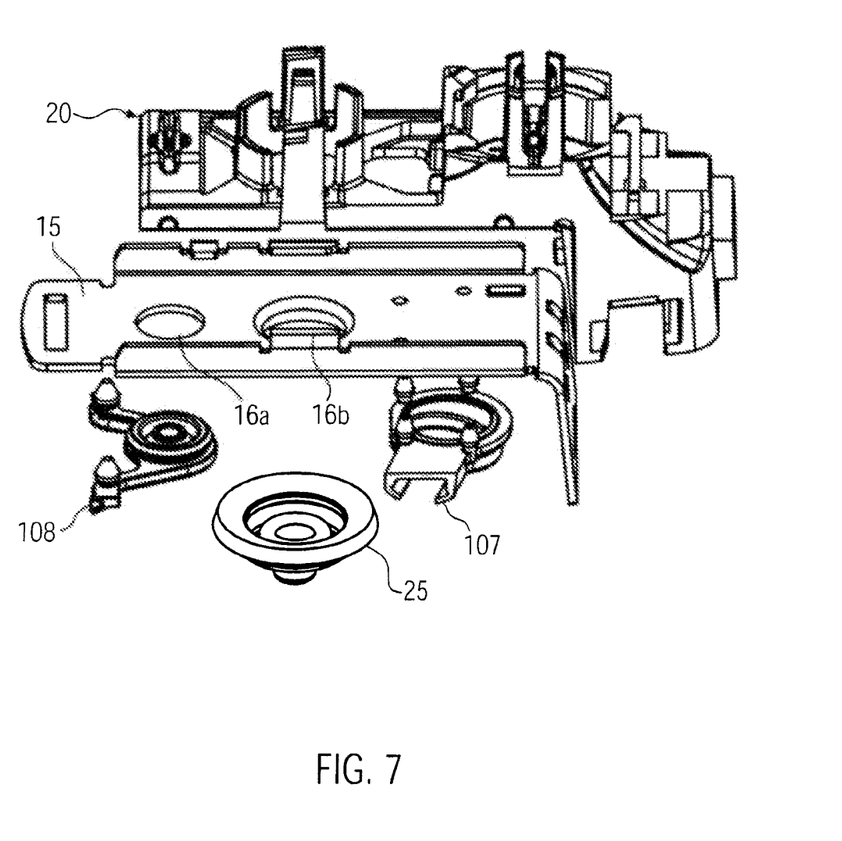
FIG. 7 shows a partial blown-up representation of the lid stem handle in accordance with the present disclosure.
Figure 8:
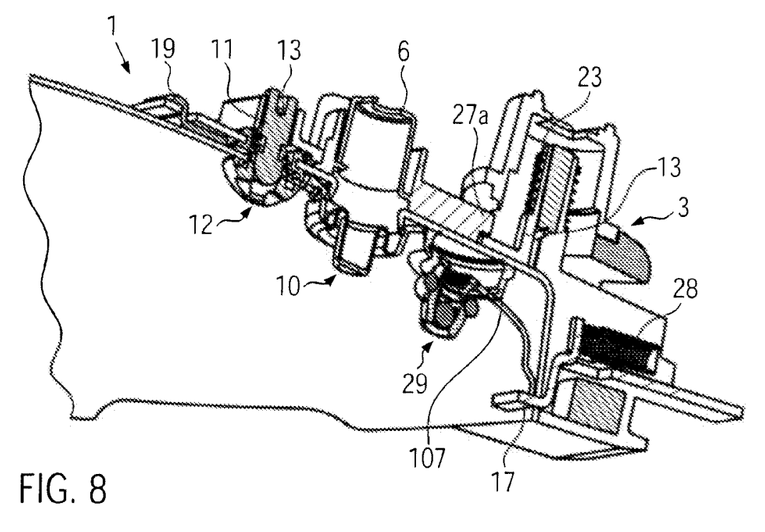
FIG. 8 shows a perspective depiction of the technology module built into the lid element.

The technology module 3 comprises movable operational elements necessary for the function of the pressure cooker. This means that these movable operational elements are integrated and fastened in the technology module 3, while the masking module 4 exclusively masks the technology module 3 and has no operational elements necessary for the function of the pressure cooker. This means that the pressure cooker would function even without a mounted masking module 4. In this embodiment, as is also explained in more detail later, the technology module 3 comprises the following operational elements: a pressure display device that is identified altogether with 10 and which displays the pressure that prevails in the cooker; a movable sealing element 11 of a working valve that is identified altogether with 12, for adjusting different pressure levels in the pressure cooker; a compression spring, in particular a torsion bar spring 13, which acts on the movable sealing element 11 with an adjustable compressive pressure; and an adjustment device 14 for changing the compressive pressure of the spring on the sealing element 11 of the working valve 12. The technology module 3 can also have a lid lock 17 (FIGS. 3, 7 and 8).

Figure 5:
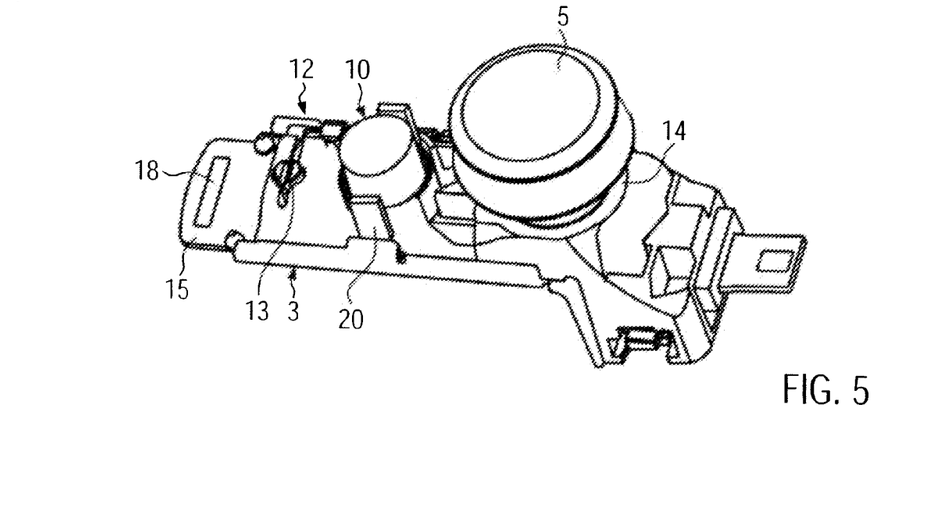
FIG. 5 shows a perspective depiction of the technology module with the rotary knob attached.

The technology module comprises, particularly as follows from FIGS. 3, 5, 6 and FIG. 7, an L-shaped support element 15 that is formed preferably from metal, particularly from a support plate, that, as follows particularly from FIGS. 5 and 7, has on its upper side at least two through holes 16a, 16b for the pressure display device 10 and for the working valve 12.

The technology module 3 or the L-shaped support element 15, on the one hand, holds the previously mentioned operational elements and is, on the other hand, also the mechanically supporting part of the lid handle. Such an L-shaped support element is simple and economical to manufacture, and can be fastened to the side and above the metallic lid element 8 in a manner that is stable and that allows it to be removed. Due to the L-shape, it is possible to arrange operational elements that have to be arranged at the top of the metallic lid element 8, such as, for example, a working valve 12, adjustment device 14 or pressure display device 10, as well as those operational elements that perform their function from the side of the metal lid element 8, such as, for example, a lid lock 17 (see FIG. 3, 7 or 8). At least one plastic holder 20, particularly in the form of an injection molded part, is fastened (for example, clipped on) to the support element 15 or to the support plate, by means of which plastic holder the individual operational elements can be held.

The technology module 3 has a fastening device 18 (FIGS. 5 and 6), which is formed here at the front end of the L-shaped support element 15, here particularly as an opening that can be made to engage with a projection 19 or hook at the surface of the lid element 8. Furthermore, the lid stem handle 2 can be fastened to the lid element 8 via the lid lock 17, which extends from the technology module 3 through to the side area of the lid element 8 (FIG. 3). The L-shaped support element 15 or the L-shaped plate can consequently be hooked in to the upper side of the lid element 8 and then fastened via the lock 17 which is introduced into an opening in the side area of the lid element 8. This fastening device is, however, only one example for arranging the technology module on the surface of the lid. In any case, however, the lid stem handle 2 is fastened in such a way that it can be removed.

The lid element 8 also has corresponding openings in order to make it possible for the various operational elements to jut into the lid interior.

One of the movable operational elements is the movable sealing element 11 of the working valve 12.

Figure 10:
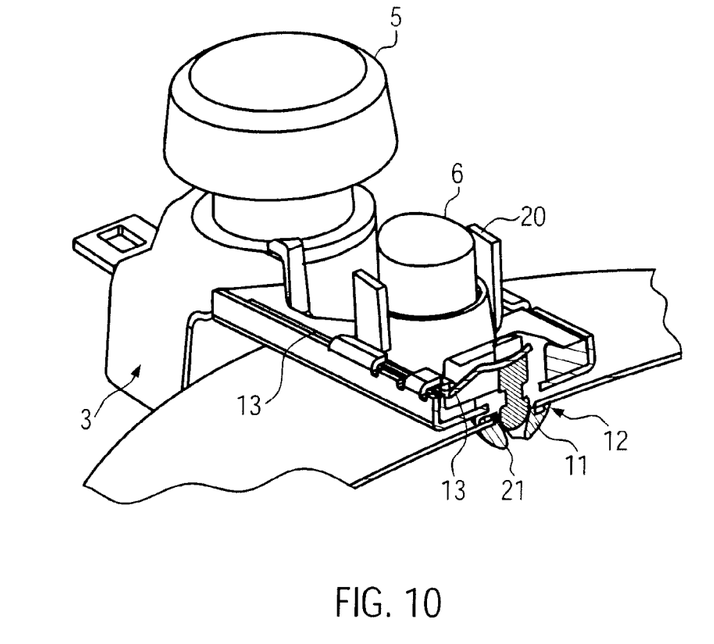
FIG. 10 shows, in a perspective sectional representation, the technology module with attached rotary knob.

As particularly follows from FIGS. 3, 8 and 10, the movable sealing element 11 of a working valve 12 is arranged via the holder 20 of the technology module 3 in such a way that it can be moved up and down in the technology module through the opening 16a. The sealing element 11 here has a spherical sealing surface, i.e., at least one spherical sealing section that sits on a valve seat 21 (FIG. 3). The torsion bar spring 13 can act upon the sealing element 11 with a compressive pressure, depending on an adjustment device 14 for changing the compressive pressure of the spring. Here the spring 13 is arranged in a groove on the upper side of the sealing element 11. As will be explained later in more detail, a certain compressive pressure corresponding to a cooking level can be selected by means of the previously mentioned adjustment device. It is consequently possible to select different pressure ranges in the cooker, which correspond, for example, to a cooking level I and a fast level II. The working valve 12 has a pressure limiting function thereby. If the pressure of a certain cooking level is exceeded, the sealing element 11 is pressed upwards, so that the working valve opens and steam can escape from the cooker. The cooking level I corresponds, for example, to a pressure in a range from 0.4 bar (40 kPa) and the cooking level II, for example, corresponds to a pressure of 0.8 bar (80 kPa). The valve seat 21 of the working valve 12 is formed in the lid 1 or in the lid element 8 as a separate or integrally molded valve seat part 21. The valve seat part is therefore guided, for example, from the interior of the lid element 8 through a corresponding opening 1 and crimped in. It is, however, also possible that a separate valve seat part is provided that is fit into the opening of the lid element with the help of a sealing element. The sealing element has, for example, a circumferential snap ring groove for this purpose, into which the edge of the opening of the lid element comes to lie.

The valve seat is advantageously formed from metal and particularly in a conical shape. The angle at which the conically formed sealing surface tapers preferably amounts to 30° to 40°, even more preferably 33° to 37° and particularly 35°.

With such a valve, it is possible to achieve improved response characteristics of the working valve 12. It is possible here to reliably maintain tolerances of <+/−20 kPa (<+/−0.2 bar). This means that only a small differential pressure is needed between the triggering pressure and the stabilization pressure.

As particularly follows from FIGS. 7 and 3, a sealing collar 108 is provided in the area of the working valve, whereby the sealing collar is arranged at the bottom of the technology module 3, here on the L-shaped support element. The sealing collar 108 is arranged in an area around the working valve 12 in such a way that the movable sealing element 11 can be fed through an opening in the sealing collar so that in this embodiment, the ring-shaped groove of the sealing element 11 comes to lie in the opening of the sealing collar. The sealing collar 108 seals the lid's upper side around the working valve with respect to the handle, i.e., here the technology module 3 or the support element 15. The sealing collar has a directed opening by means of which the steam that escapes from the working valve can be selectively dissipated to the front. The opening could also alternatively or additionally be directed to the side. In this way, the steam is prevented from escaping in an uncontrolled manner upwards, for example, into the technology module, or backwards in the direction of the hand of the operator. The steam can then be selectively dissipated in the direction forwards between the masking module 4 and the lid.

Figure 6:
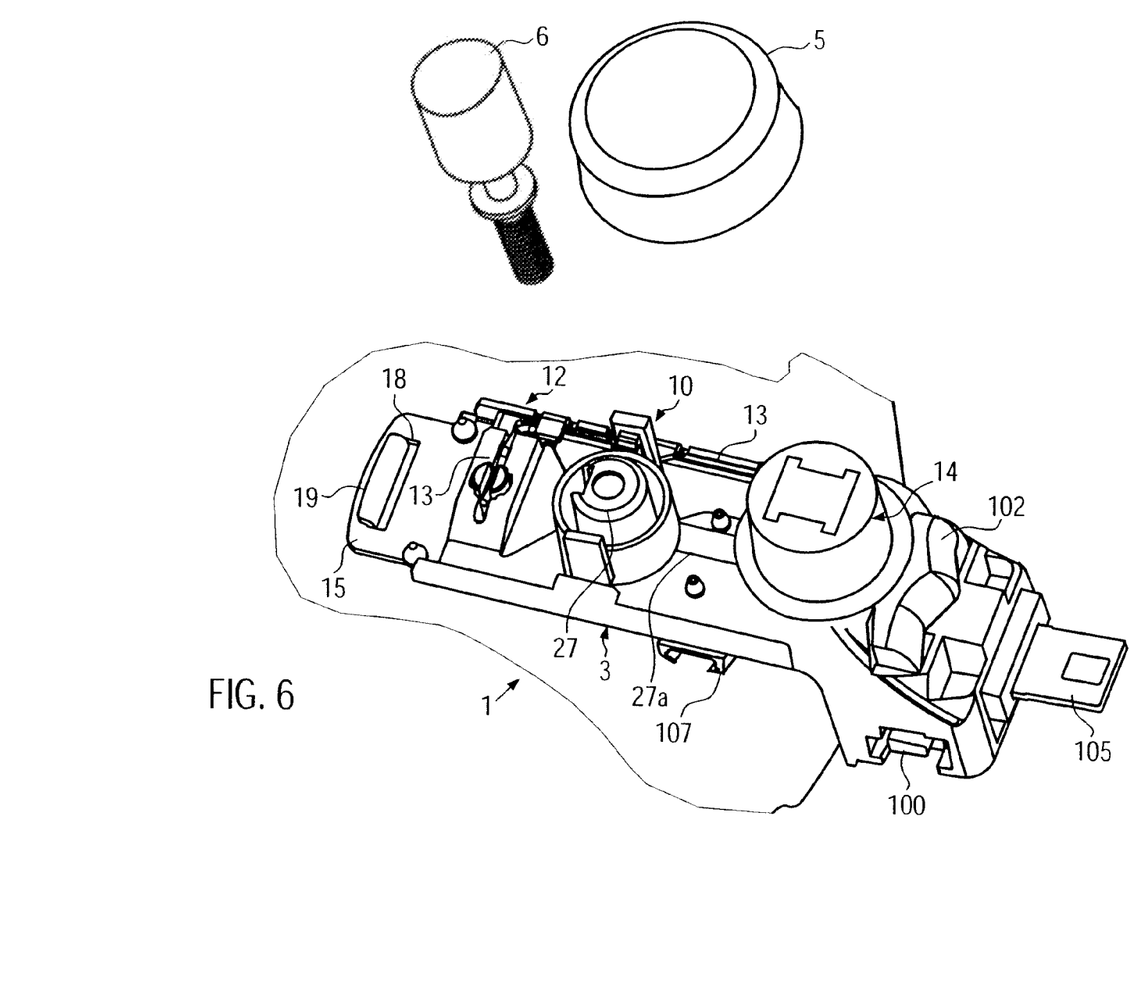
FIG. 6 shows, in a perspective depiction, the technology module with the rotary knob removed and the pressure display cap removed.
Figure 9:
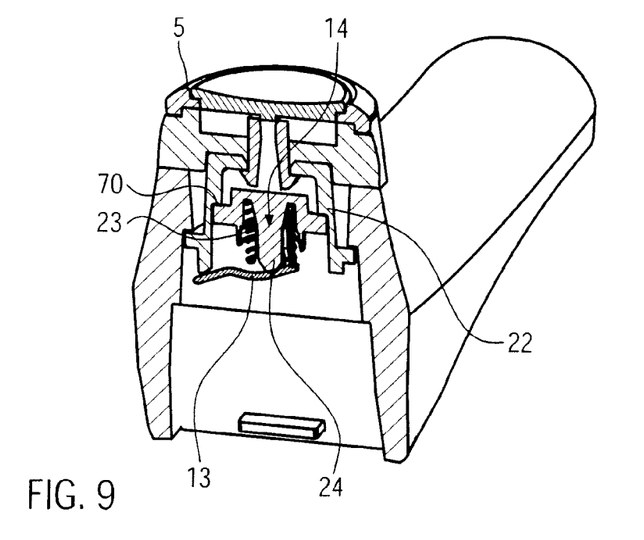
FIG. 9 shows a cut along the line II-II in FIG. 1.

The torsion bar spring 13, which lies on the sealing element 11, bends sharply, as particularly follows from FIGS. 6 and 9, and runs along the L-shaped support element 15 up to an adjustment device 14, which can change the compressive pressure with which the spring 13 presses on the sealing element 11. In this embodiment, a torsion bar spring is used. The opposite end of the torsion bar spring 13 here is, as particularly follows from FIG. 9, acted upon by a force. Here the adjustment device 14 comprises a rotating mechanism 22, which, particularly depending on the rotational movement, acts on the end of the torsion bar spring 13 with a predetermined force in such a way that a certain force is exercised on the sealing element 11 by the other end of the torsion bar spring, whereby this force corresponds to a certain desired pressure in the cooker. By rotating the rotating mechanism 22, a corresponding force is exercised on the torsion bar spring 13 against the spring force of the spring 23 via the pressure element 24 which moves up or down. To activate the rotating mechanism 22, a rotary knob 5 is fastened in an opening at the upper end, whereby this rotary knob 5 transfers the rotational movement to the rotating mechanism 22. At this juncture, the pressure adjustment consequently is effected via the free-moving, locking rotary knob 5 due to the pressure element 24 pre-tensioning the torsion bar spring 13 through a curve 70 in part 22. The pressure element 24, or its projections that are run in the curve, can as a result snap into place in additional recesses that are formed in the curve. The rotational movement can, however, also be effected in a continuous manner. The rotary knob is attached to the rotating mechanism 22 after the masking module 4 has already been placed on to the technology module 3. The full function of the technology module 3 would, however, be guaranteed even without the masking module 4.

Even if not explicitly depicted in FIG. 6, which shows the adjustment device 14 or the rotating mechanism 22 with the rotary knob 5 removed, the rotary knob can have various adjustment possibilities on its upper side, such as: "Open", "0", "1" and "2". "Open" corresponds to a setting in which the lid is unlocked and can be opened. "0" corresponds to a setting in which no excess pressure should be built up and in which the force that acts on the sealing element 11 is adjusted in such a way that the valve 12 is opened. Positions "1" and "2" correspond to the previously mentioned cooking levels I and II and the corresponding previously specified pressure ranges.

The rotary knob here comprises a cap. The cap can be chrome-plated, for example. The rotary knob is connected to the rotating mechanism 22.

As particularly follows from FIG. 3, the pressure display device 10, which displays the pressure prevailing in the cooker, lies between the working valve 12 and the adjustment device 14. As particularly also follows from FIG. 3, a protective membrane 25 is provided for the pressure display device 10 at its lower end, whereby this protective membrane is fastened in a sealing fashion from the inside of the cooker lid 1 in the opening 16b. The pressure display shaft 7 is held in the holder 20 on the support element 15 in such a way that it can move up and down in the part 27 (FIG. 6). The pressure display cap 6 is fastened at the top of the pressure display shaft 7. The spring 33 is arranged around the shaft 7 and acts downwards upon the shaft with a certain spring force. If the pressure in the closed pressure cooker rises, the pressure display shaft 7 is moved upwards as far as a limit stop, whereby the height at which the pressure display cap protrudes from the handle is a measure of the pressure in the cooker.

The operator can tell roughly how high the pressure in the cooker is on the basis of the height at which the pressure display cap 6 juts out of the handle 2. If the pressure is too high and the working valve 12 opens, the operator hears a soft hissing, which indicates that the temperature must be reduced in order to reach the desired pressure range in the cooker. For identifying the pressure levels, the cap 6 has two rings, for example.

To be mentioned as a further operational element is the lock 17, as particularly follows from FIGS. 3 and 8. The lid lock, here in the form of a locking plate 17, protrudes into the lid 1 or the lid element 8 through an opening, and is pre-tensioned inwards by the spring 28. The locking element 17 is also held in the technology module 3, in a corresponding holder 20 attached to the L-shaped support element 15.

The handle-lid latching mechanism functions particularly as follows: The technology module 3 is hung on the tab 19 via the support element 15. By being swivelled into the resting position, the lock 17 is pressed against the spring 28 and locks into the lid element 8 (FIGS. 3 and 8). If the lid 1 is placed on to the cooker bottom part (not shown) via the bayonet catch, the lock 17 can be blocked by means of a locking bridge by turning the rotary knob in such a way that the handle cannot be removed from the lid 8. This mechanism can be implemented in such a way that when the lid is put on, a locking part 100 is moved against a spring 101. If the two handles 2, 9 are above one another, turning the rotary knob 5 causes the locking bridge 102 to be displaced downwards (FIGS. 3 and 6), as a result of which the lock 17 is simultaneously blocked. The handle 2 cannot be removed from the lid 1.

With the help of the area 105, on to which an unlocking button (not shown) can be mounted, the locking element 17 can be pulled against the spring force of the spring 28 backward from the lid when the cooker is open.

Although preferably all operational elements are integrated in the technology module, preferably a safety valve 29 in the form of a self-reversing pressure-relief valve 29, as particularly follows from FIGS. 3 and 8, is provided in the cooker lid. The lid element 8 has a corresponding opening for this purpose. The self-reversing pressure-relief valve 29 has the function of protecting against excess pressure, of an automatic vent and of preventing a vacuum. The valve has a valve housing that has a through hole. The valve housing is preferably made of metal, particularly polished stainless steel. The pressure-relief valve has a ball 31 that is pressurized by the spring 30. The through hole of the valve housing has a conical surface as the valve seat. For sealing, the ball lies on the conical surface, whereby, as also with the working valve, the ball lies on the conical surface. Here the angle at which the conical surface of the valve seat tapers preferably amounts to 30° to 40°, particularly 33° to 37° and even more preferably 35°. The pressure-relief valve 29 is slid into an opening of the lid 8 and has a crimped edge in the upper area, with which it sits on the lid. The pressure-relief valve furthermore has a sealing ring 30a. The pressure-relief valve can be moved up and down in the opening in the cooker lid. Provided in the housing of the pressure-relief valve are openings 31a, through which the air can escape from the cooker during heating. If the excess pressure continues to rise, the pressure-relief valve moves upwards, so that the seal 30 seals the cooker lid. Not until the excess pressure of, for example, >1.5 bar is reached would the ball 31 move upwards against the spring force and open the valve.

As particularly follows from FIGS. 7, 3 and 8, here a sealing element 107 is provided on the L-shaped support element 15 on the technology module 3, whereby in an area around the pressure-relief valve 29, this sealing element seals off the lid's upper side with respect to the handle 2, i.e., in this case, with respect to the technology module 3. The sealing element 107 here has an opening through which the steam that escapes from the pressure-relief valve can then be selectively dissipated, particularly to the side. In this way, the steam is prevented from escaping in an uncontrolled manner upwards in the direction of the technology module, or backwards in the direction of the hand of the operator. The steam can then escape selectively between the masking module 4 and lid 1.

As follows from FIGS. 6 and 8, a residual pressure stop comprises the part 27a, which is lifted along by the pressure display (shaft 7) in such a way that it locks the opening movement of the rotary knob 5 by part 22.

Figure 11:
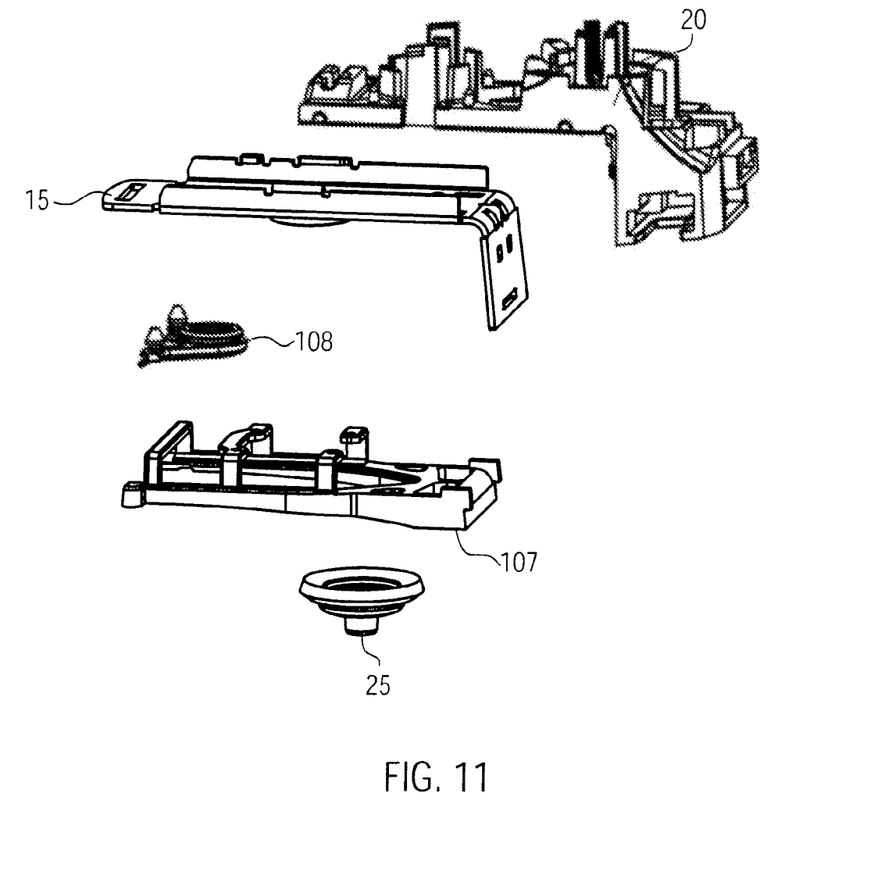
FIG. 11 shows a partial blown-up representation of a lid stem handle in accordance with a further embodiment of the present disclosure.

FIG. 11 shows an additional embodiment of the present disclosure, which corresponds to the first embodiment explained in connection with FIGS. 1 to 10. This embodiment differs only due to the formation of the sealing element 107. With the previous embodiment, the sealing element 107 is formed in such a way that the steam is dissipated to the side. Here the sealing element 107 is likewise fastened to the underside of the technology module 3, here to the L-shaped support element 15. Here the sealing element 107 also seals an area around the pressure-relief valve 29 between the lid's upper side and technology module, i.e., here support element 15. The opening through which the steam is dissipated extends not only to the side, but also to the front, so that steam can be dissipated selectively at the front end of the handle 2 between the masking module 4 and lid 1. As follows from FIG. 11, the sealing element here has shanks that are so long that the steam can be dissipated in an area in the front third of the handle 2. In the assembled state, the shanks of the sealing element 107 here surround the sealing collar 108, so that steam from both the working valve and the pressure-relief valve can be dissipated in a direction towards the front. As already explained, the module design of the lid stem handle 2 allows a variety of variants, because the masking module 4 has only the function of a masking element and can be exchanged in a simple manner. Due to the fact that, for example, the technology module 3 can be used for different pressure cooker variants, the production of different pressure cooker variants is made more economical and simpler.

In particular, the present disclosure also relates to a system for different pressure cooker variants, in which one and the same technology module 3 can be used, whereby, however, different variants for the masking module 4 are provided that differ in their form and/or color.

The invention claimed is:

1. A lid for a pressure cooker with a removable lid handle, comprising:
    a technology module that has movable operational elements needed for the function of the pressure cooker;
    a masking module that masks the technology module;
    wherein the technology module comprises at least one of the operational elements of the group including: a pressure display device; a lid lock; a movable sealing element of a working valve for selecting different pressure levels in the pressure cooker; a compression spring that acts upon the movable sealing element with an adjustable compressive pressure; and an adjustment device for changing the compressive pressure on the compression spring on the sealing element; and
    wherein the adjustment device for changing the compressive pressure on the sealing element comprises a rotating mechanism, and wherein, depending on the rotational movement, one end of the compression spring is acted upon with a pre-determined force in such a way that a certain force is exerted on the sealing element by the other end of the compression spring.

2. The lid according to claim 1, further comprising a rotary knob placed upon the rotating mechanism.

3. The lid according to claim 1, wherein the masking module is formed from a plastic part that has at least two openings on an upper side for the pressure display device and the adjustment device for changing the compressive pressure.

4. A system for pressure cookers formed with a lid formed in accordance with claim 1, and suitable masking modules one of different shapes, different colors, and a combination thereof are provided for a certain technology module.

5. The lid according to claim 1, wherein the technology module has the movable sealing element of the working valve and a valve seat is formed in the lid as one of a separate or integrally molded valve seat part.

6. The lid according to claim 5, wherein one of the valve seat, the sealing element, and a combination thereof are formed from a solid material, and wherein the valve seat or the sealing element has a conical sealing surface.

7. The lid according to claim 6, wherein the solid material comprises one of a duroplast, thermoplast, resin and metal.

8. The lid according to claim 5, wherein the sealing element or the valve seat has a spherical sealing surface.

9. A lid for a pressure cooker with a removable lid handle, comprising:
    a technology module that has movable operational elements needed for the function of the pressure cooker;
    a masking module that masks the technology module;
    a sealing element provided around an area around a pressure-relief valve, wherein the sealing element seals the lid's upper side with respect to the technology module, and has an opening through which the steam escaping from the pressure-relief valve can be dissipated in one of a lateral direction and to a front of the cooker.

10. The lid according to claim 9, wherein the pressure-relief valve is a self-reversing pressure relief valve arranged in the cooker lid.

11. The lid according to claim 9, wherein the technology module is formed from an L-shaped support element.

12. The lid according to claim 11, wherein the support element is a support plate.

13. The lid according to claim 9, wherein the technology module has a fastening device for fastening the lid handle to the lid.

14. The lid according to claim 9, wherein the removable lid handle is a lid stem handle.

15. The lid according to claim 14, wherein the masking module is clipped on the technology module.

16. A lid for a pressure cooker with a removable lid handle, comprising:
    a technology module that has movable operational elements needed for the function of the pressure cooker;
    a masking module that masks the technology module;
    wherein the technology module comprises at least one of the operational elements of the group including: a pressure display device; a lid lock; a movable sealing element of a working valve for selecting different pressure levels in the pressure cooker; a compression spring that acts upon the movable sealing element with an adjustable compressive pressure; and an adjustment device for changing the compressive pressure on the compression spring on the sealing element; and
    wherein the compression spring is a torsion bar spring.

17. The lid according to claim 16, and wherein the masking module is attached to the technology module.

* * * * *